(12) United States Patent
Nehl

(10) Patent No.: US 7,936,167 B2
(45) Date of Patent: May 3, 2011

(54) ROTARY VELOCITY SENSOR AND ROTARY POSITION AND VELOCITY SENSOR

(75) Inventor: Thomas Wolfgang Nehl, Shelby Township, MI (US)

(73) Assignee: BWI Company Limited S.A., Luxembourg (LU)

( * ) Notice: Subject to any disclaimer, the term of this patent is extended or adjusted under 35 U.S.C. 154(b) by 434 days.

(21) Appl. No.: 12/214,095

(22) Filed: Jun. 17, 2008

(65) Prior Publication Data

US 2009/0309584 A1 Dec. 17, 2009

(51) Int. Cl.
*G01B 7/30* (2006.01)
(52) U.S. Cl. ............ 324/207.25; 324/207.2; 324/207.21
(58) Field of Classification Search .................. None
See application file for complete search history.

(56) References Cited

U.S. PATENT DOCUMENTS

| | | | |
|---|---|---|---|
| 4,337,435 A | 6/1982 | Munoz | |
| 5,251,729 A | 10/1993 | Nehl et al. | |
| 5,637,997 A * | 6/1997 | Hore et al. | 324/207.16 |
| 6,489,761 B1 | 12/2002 | Schroeder et al. | |
| 6,777,928 B2 * | 8/2004 | Ramirez | 324/207.25 |
| 6,866,127 B2 | 3/2005 | Nehl et al. | |
| 7,308,975 B2 | 12/2007 | Nehl et al. | |

OTHER PUBLICATIONS

Nehl et al., "An Integrated Relative Velocity Sensor For Real Time Damping Application" IEE 0-7803-3008-0/95 pp. 484-491 (1995).

* cited by examiner

*Primary Examiner* — Minh N Tang
(74) *Attorney, Agent, or Firm* — Dickinson Wright PLLC

(57) ABSTRACT

A rotary velocity sensor includes a stator having a coil and a rotor having a permanent magnet. The rotor is substantially coaxially aligned with the central longitudinal axis of the stator, surrounds the coil, and is rotatable with respect to the stator about the axis. A rotary position and velocity sensor includes a non-magnetic stator having a magnetosensitive device and having at least one coil and includes a non-magnetic rotor having at least one permanent magnet. The magnetosensitive device has a sensing surface with a normal axis aligned substantially perpendicular to the stator axis. The at-least-one coil has a central coil axis aligned substantially perpendicular to the stator axis. The rotor is substantially coaxially aligned with the central longitudinal axis of the stator, surrounds the at-least-one coil, and is rotatable with respect to the stator about the stator axis.

20 Claims, 5 Drawing Sheets

US 7,936,167 B2

ROTARY VELOCITY SENSOR AND ROTARY POSITION AND VELOCITY SENSOR

TECHNICAL FIELD

The present invention relates generally to sensors, and more particularly to a rotary (angular) velocity sensor and to a rotary (angular) position and velocity sensor.

BACKGROUND OF THE INVENTION

Conventional rotary (angular) position sensors include the analog angle encoder disclosed in U.S. Pat. No. 6,489,761. In the disclosed analog angle encoder, a magnetosensitive device, such as a Hall sensor, was embedded in a central post of a stator. The central post was surrounded by a rotor having a permanent magnet. The output from the magnetosensitive device varied sinusoidally with the rotary angular position of the central flux axis of the magnet with respect to a normal axis of the sensing surface of the magnetosensitive device.

Rotary velocity was obtained in U.S. Pat. No. 6,489,761 by taking the time derivative of a sine/cosine resolver of the rotary angular position. It is noted that the differentiation process introduced undesirable noise and introduced an undesirable phase delay between the actual and computed rotary velocities.

What is needed is an improved rotary velocity sensor and an improved rotary position and velocity sensor.

SUMMARY OF THE INVENTION

A first expression of an embodiment of the invention is for a rotary velocity sensor including a non-magnetic stator, a first coil, a non-magnetic rotor, and a first permanent magnet. The stator has a central longitudinal axis. The first coil is non-rotatably attached to the stator. The rotor is substantially coaxially aligned with the central longitudinal axis, surrounds the first coil, and is rotatable with respect to the stator about the central longitudinal axis. The first permanent magnet is non-rotatably attached to the rotor.

A second expression of an embodiment of the invention is for a rotary velocity sensor including a non-magnetic stator, a first coil and a second coil, a non-magnetic rotor, and a first permanent magnet and a second permanent magnet. The stator has a central longitudinal axis. The first and second coils each are non-rotatably attached to the stator. The rotor is substantially coaxially aligned with the central longitudinal axis, surrounds the first and second coils, and is rotatable with respect to the stator about the central longitudinal axis. The first and second permanent magnets each are non-rotatably attached to the rotor.

A third expression of an embodiment of the invention is for a rotary position and velocity sensor including a non-magnetic stator, a magnetosensitive device, at least one coil, a non-magnetic rotor, and at least one permanent magnet. The stator has a central longitudinal axis. The magnetosensitive device is non-rotatably attached to the stator and has a sensing surface with a normal axis aligned substantially perpendicular to the central longitudinal axis of the stator. The at-least-one coil is non-rotatably attached to the stator and has a central coil axis aligned substantially perpendicular to the central longitudinal axis of the stator. The rotor is substantially coaxially aligned with the central longitudinal axis of the stator, surrounds the at-least-one coil, and is rotatable with respect to the stator about the central longitudinal axis. The at-least-one permanent magnet is non-rotatably attached to the rotor.

Several benefits and advantages are derived from one or more or all of the expressions of the embodiment of the invention. In one example, rotary velocity is computed without introducing undesirable noise and/or undesirable phase delay caused by conventional differentiation of the rotary position. This results in improved accuracy of the computed rotary velocity which results, in one application, in improved performance of an otherwise conventional vehicle controlled damping system when the rotary velocity sensor and/or the rotary position and velocity sensor of one or more or all of the expressions of the embodiment of the invention is employed to determine body height in a conventional vehicle controlled damping system.

DETAILED DESCRIPTION

Figure 1:
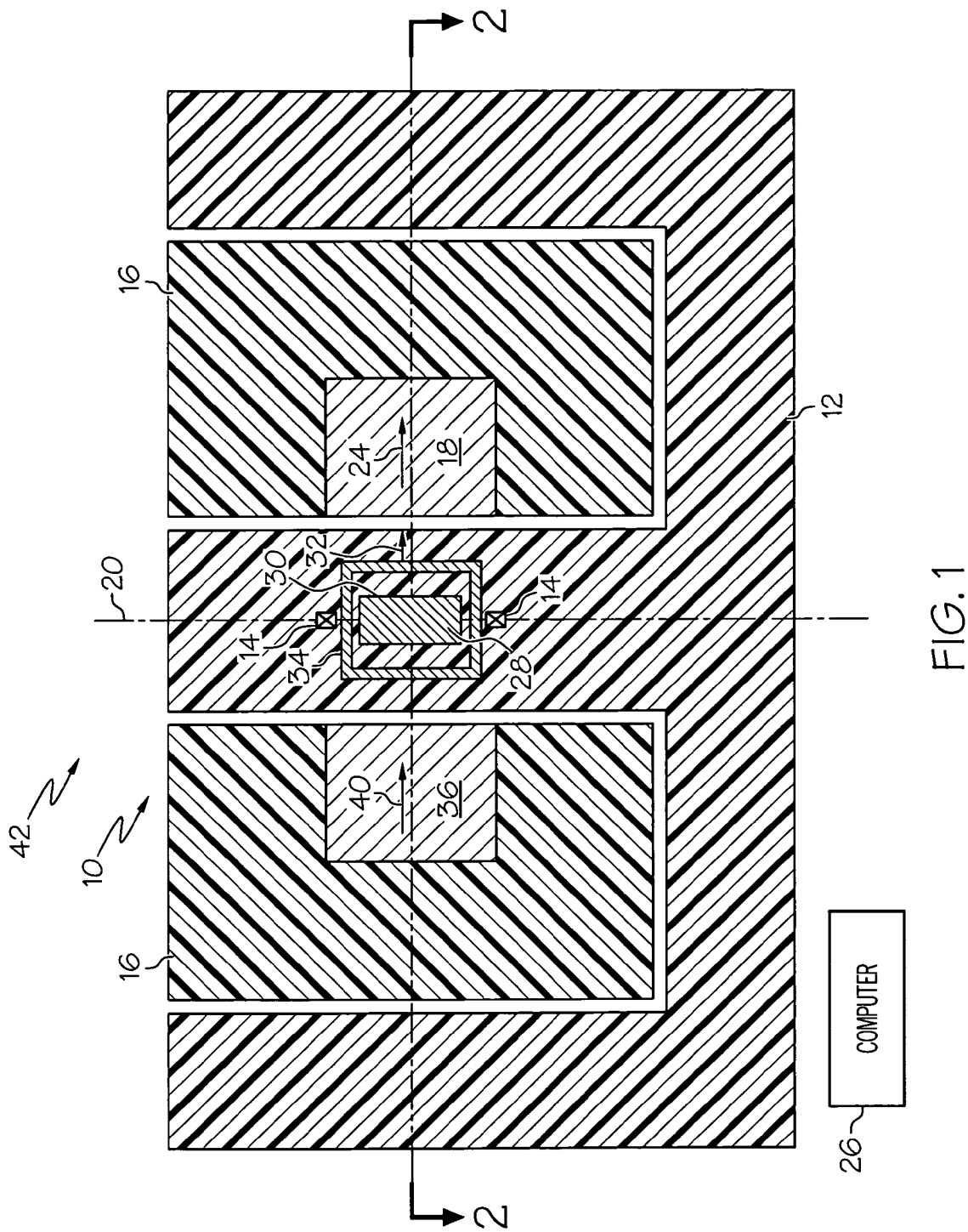
FIG. 1 is a schematic, cross-sectional side view of an embodiment of the invention showing the entire second coil (only one turn of which being illustrated for clarity), wherein connections to the computer have been omitted for clarity.
Figure 2:
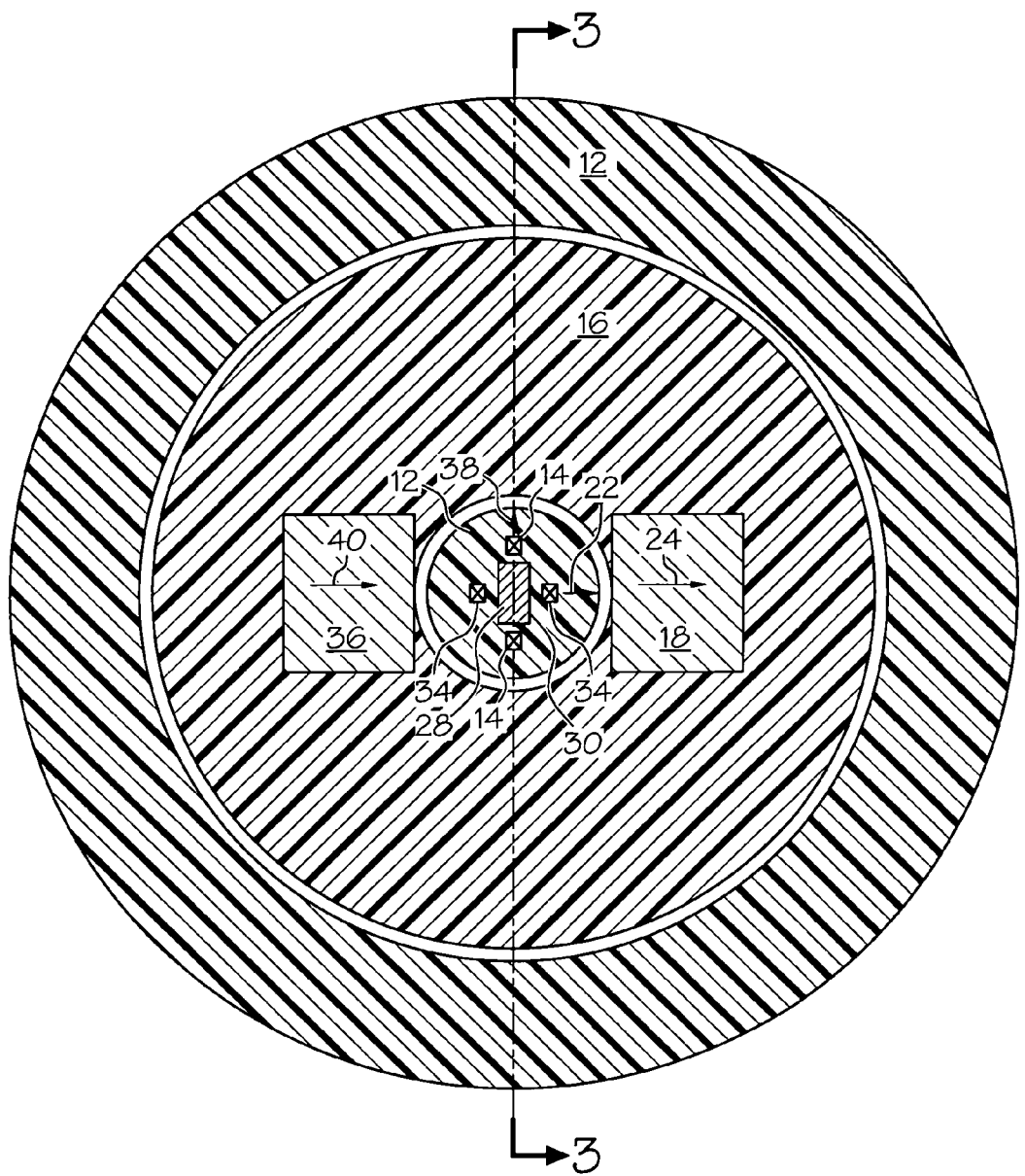
FIG. 2 is a cross-sectional view of the embodiment of FIG. 1 taken along lines 2-2 of FIG. 1.
Figure 3:
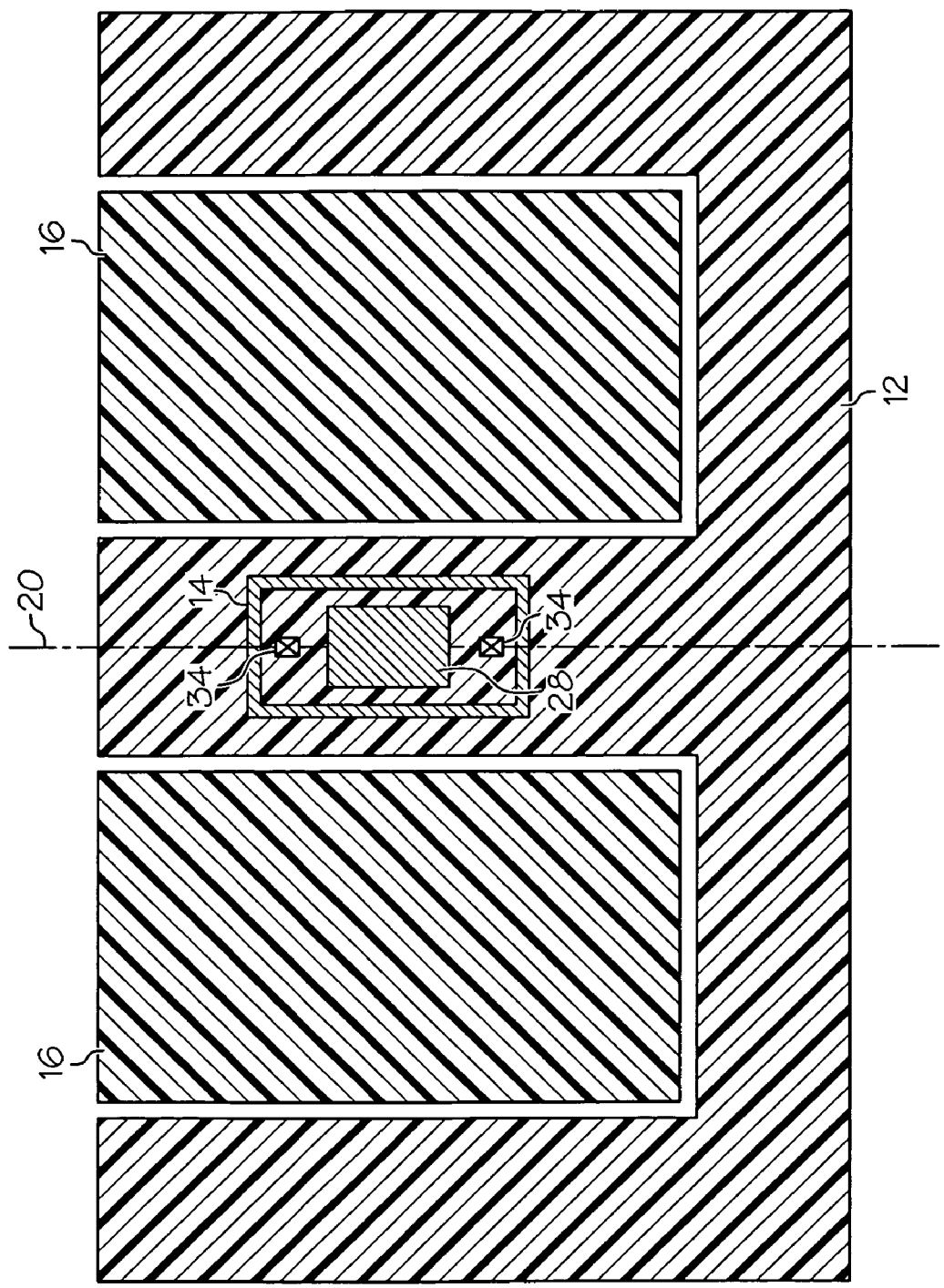
FIG. 3 is a cross-sectional view of the embodiment of FIG. 1 taken along lines 3-3 of FIG. 2 showing the entire first coil (only one turn of which being illustrated for clarity)
Figure 4:
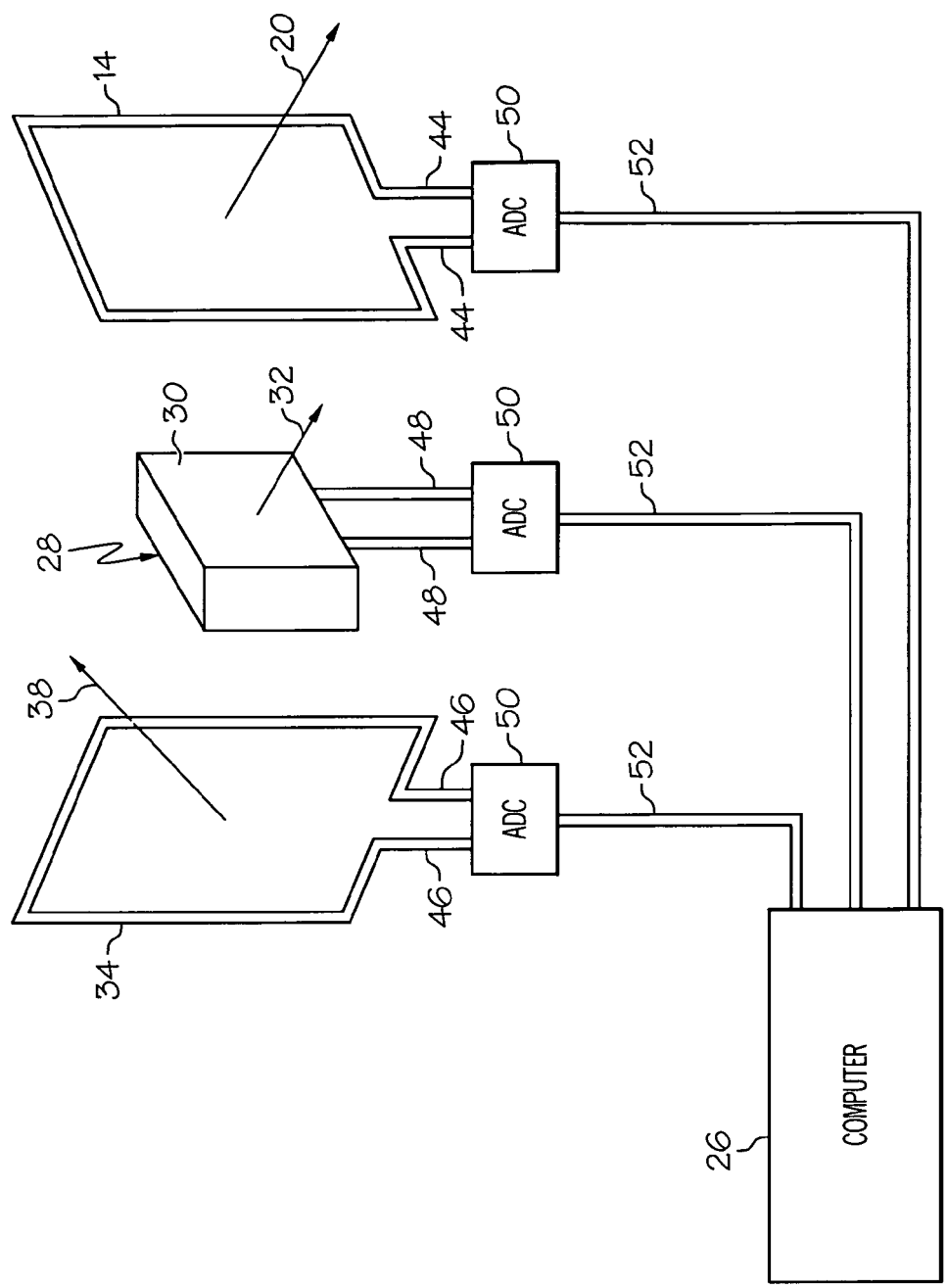
FIG. 4 is an explanatory diagram of the magnetosensitive device, the first and second coils (only one turn of each being illustrated for clarity), and the computer of FIG. 1 showing the connections to the computer, wherein, for clarity, the coils are shown not surrounding the magnetosensitive device.

Referring now to the drawings, FIGS. 1-5 show an embodiment of the present invention. A first expression of the embodiment of FIGS. 1-5 is for a rotary velocity sensor 10 including a non-magnetic stator 12, a first coil 14, a non-magnetic rotor 16, and a first permanent magnet 18. The stator 12 has a central longitudinal axis 20. The first coil 14 is non-rotatably attached to the stator 12. The rotor 16 is substantially coaxially aligned with the central longitudinal axis 20, surrounds the first coil 14, and is rotatable with respect to the stator 12 about the central longitudinal axis 20. The first permanent magnet 18 is non-rotatably attached to the rotor 16.

In one implementation of the first expression of the embodiment of FIGS. 1-5, the first coil 14 has a central coil axis 22 aligned substantially perpendicular to the central longitudinal axis 20 of the stator 12. In one variation, the first permanent magnet 18 has a central flux axis 24 aligned substantially perpendicular to the central longitudinal axis 20 of the stator 12. It is noted that the central coil axis 22 and the central flux axis 24 are shown angularly spaced apart, due to rotation of the rotor 16, only in FIG. 5.

In one modification, the rotor 16 is rotatable less than half a revolution with respect to the stator 12 about the central longitudinal axis 20 of the stator 12. In one example, the rotary velocity sensor 10 also includes a computer 26 adapted to receive as an input a voltage $v_1(t)$ induced in the first coil 14 and adapted to compute a rotary velocity ω of the rotor 16 with respect to the stator 12 about the central longitudinal axis 20 of the stator 12 using at least the input, a predetermined maximum flux linkage $\lambda_m$ of the first coil 14, and an angle $\theta$ about the central longitudinal axis 20 of the stator 12 between the central coil axis 22 of the first coil 14 and the central flux axis 24 of the first permanent magnet 18. In one illustration, the rotary velocity sensor 10 also includes a magnetosensitive device 28 (i.e., a device, such as a Hall sensor, having an output which sinusoidally varies with the angle between a magnetic field direction and the sensing surface of the device) non-rotatably attached to the stator 12, surrounded by the rotor 16, having a sensing surface 30 with a normal axis 32 (i.e., an axis perpendicular to the surface) aligned substantially along the central coil axis 22 of the first coil 14, and having an output, wherein the computer 26 is adapted to compute the angle $\theta$ using the output of the magnetosensitive device 28.

A second expression of the embodiment of FIGS. 1-5 is for a rotary velocity sensor 10 including a non-magnetic stator 12, a first coil 14 and a second coil 34, a non-magnetic rotor 16, and a first permanent magnet 18 and a second permanent magnet 36. The stator 12 has a central longitudinal axis 20. The first and second coils 14 and 34 each are non-rotatably attached to the stator 12. The rotor 16 is substantially coaxially aligned with the central longitudinal axis 20, surrounds the first and second coils 14 and 34, and is rotatable with respect to the stator 12 about the central longitudinal axis 20. The first and second permanent magnets 18 and 36 each are non-rotatably attached to the rotor 16.

In one implementation of the embodiment of FIGS. 1-5, the first coil 14 has a central coil axis 22 aligned substantially perpendicular to the central longitudinal axis 20 of the stator 12, the second coil 34 has a central coil axis 38 aligned substantially perpendicular to the central longitudinal axis 20 of the stator 12, the central coil axis 38 of the second coil 34 is substantially perpendicular to the central coil axis 22 of the first coil 14, and the first and second coils 14 and 34 are substantially identical. In one variation, the first permanent magnet 18 has a central flux axis 24 aligned substantially perpendicular to the central longitudinal axis 20 of the stator 12, the second permanent magnet 36 has a central flux axis 40 aligned substantially along, and in a same direction with, the central flux axis 24 of the first permanent magnet 18, and the first and second permanent magnets 18 and 36 are substantially diametrically opposed and substantially identical. In one modification, the rotary velocity sensor 10 also includes a computer 26 adapted to receive as inputs a voltage $v_1(t)$ induced in the first coil 14 and a voltage $v_2(t)$ induced in the second coil 34 and adapted to compute a rotary velocity $\omega$ of the rotor 16 with respect to the stator 12 about the central longitudinal axis 20 of the stator 12 using at least the inputs and a predetermined maximum flux linkage $\lambda_m$ of the first coil 14.

A third expression of the embodiment of FIGS. 1-5 is for a rotary position and velocity sensor 42 including a non-magnetic stator 12, a magnetosensitive device 28, at least one coil 14 and 34, a non-magnetic rotor 16, and at least one permanent magnet 18 and 36. The stator 12 has a central longitudinal axis 20. The magnetosensitive device 28 is non-rotatably attached to the stator 12 and has a sensing surface 30 with a normal axis 32 aligned substantially perpendicular to the central longitudinal axis 20 of the stator 12. The at-least-one coil 14 and 34 is non-rotatably attached to the stator 12 and has a central coil axis 22 and 38 aligned substantially perpendicular to the central longitudinal axis 20 of the stator 12. The rotor 16 is substantially coaxially aligned with the central longitudinal axis 20 of the stator 12, surrounds the at-least-one coil 14 and 34, and is rotatable with respect to the stator 12 about the central longitudinal axis 20. The at-least-one permanent magnet 18 and 36 is non-rotatably attached to the rotor 16.

In one implementation of the third expression of the embodiment of FIGS. 1-5, the magnetosensitive device 28 and the at least one coil 14 and 34 each are embedded in the stator 12. In one variation, the at-least-one coil 14 and 34 surrounds the magnetosensitive device 28. In one example, the magnetosensitive device 28 is a Hall sensor.

In a first enablement of the third expression of the embodiment of FIGS. 1-5, the at-least-one permanent magnet 18 and 36 includes a first permanent magnet 18 and a second permanent magnet 36, the first permanent magnet 18 has a central flux axis 24 aligned substantially perpendicular to the central longitudinal axis 20 of the stator 12, the second permanent magnet 36 has a central flux axis 38 aligned substantially along, and in a common direction with, the central flux axis 24 of the first permanent magnet 18, and the first and second permanent magnets 18 and 36 are substantially diametrically opposed and substantially identical.

In a first variation of the first enablement, the at-least-one coil 14 and 34 includes a first coil 14 and a second coil 34, wherein the first coil 14 has a central coil axis 22 aligned substantially along the normal axis 32 of the sensing surface 30 of the magnetosensitive device 28, wherein the second coil 34 has a central coil axis 38 aligned substantially perpendicular to the central longitudinal axis 20 of the stator 12, wherein the central coil axis 38 of the second coil 34 is substantially perpendicular to the central coil axis 22 of the first coil 14, and wherein the first and second coils 14 and 34 are substantially identical. In one modification, the rotary position and velocity sensor 42 also includes a computer 26 adapted receive as inputs a voltage $v_1(t)$ induced in the first coil 14 and a voltage $v_2(t)$ induced in the second coil 34 and adapted to compute a rotary velocity $\omega$ of the rotor 16 with respect to the stator 12 about the central longitudinal axis 20 of the stator 12 using at least the inputs and a predetermined maximum flux linkage $\lambda_m$ of the first coil 14.

In one illustration of the first variation, the magnetosensitive device 28 has an output, and the computer 26 is adapted to compute an angle $\theta$ about the central longitudinal axis 20 of the stator 12 between the central flux axis 24 of the first permanent magnet 18 and the normal axis 32 of the sensing surface 30 of the magnetosensitive device 28 using the output of the magnetosensitive device 28. In one technique, the angle $\theta$ is computed as the arccosine of (the output of the magnetosensitive device 28 divided by the predetermined maximum output of the magnetosensitive device 28). U.S. Pat. No. 6,489,761, entitled "Magnetic Arrangement for an Analog Angle Encoder", is incorporated herein by reference, and describes how the output of a magnetosensitive device varies sinusoidally with the angle $\theta$.

When two coils (the first coil 14 and the second coil 34) are present, one technique for computing the rotary (angular) velocity $\omega$ is as follows.

The maximum flux linkage of a coil with N-turns that is located between two magnets occurs when the axes of the coil and magnets are aligned and is given by:

$$\lambda_m = N\phi_m \rightarrow N = \text{number of turns} \quad (1)$$

wherein $\phi_m$ is the maximum flux linkage of a one-turn coil.

Figure 5:
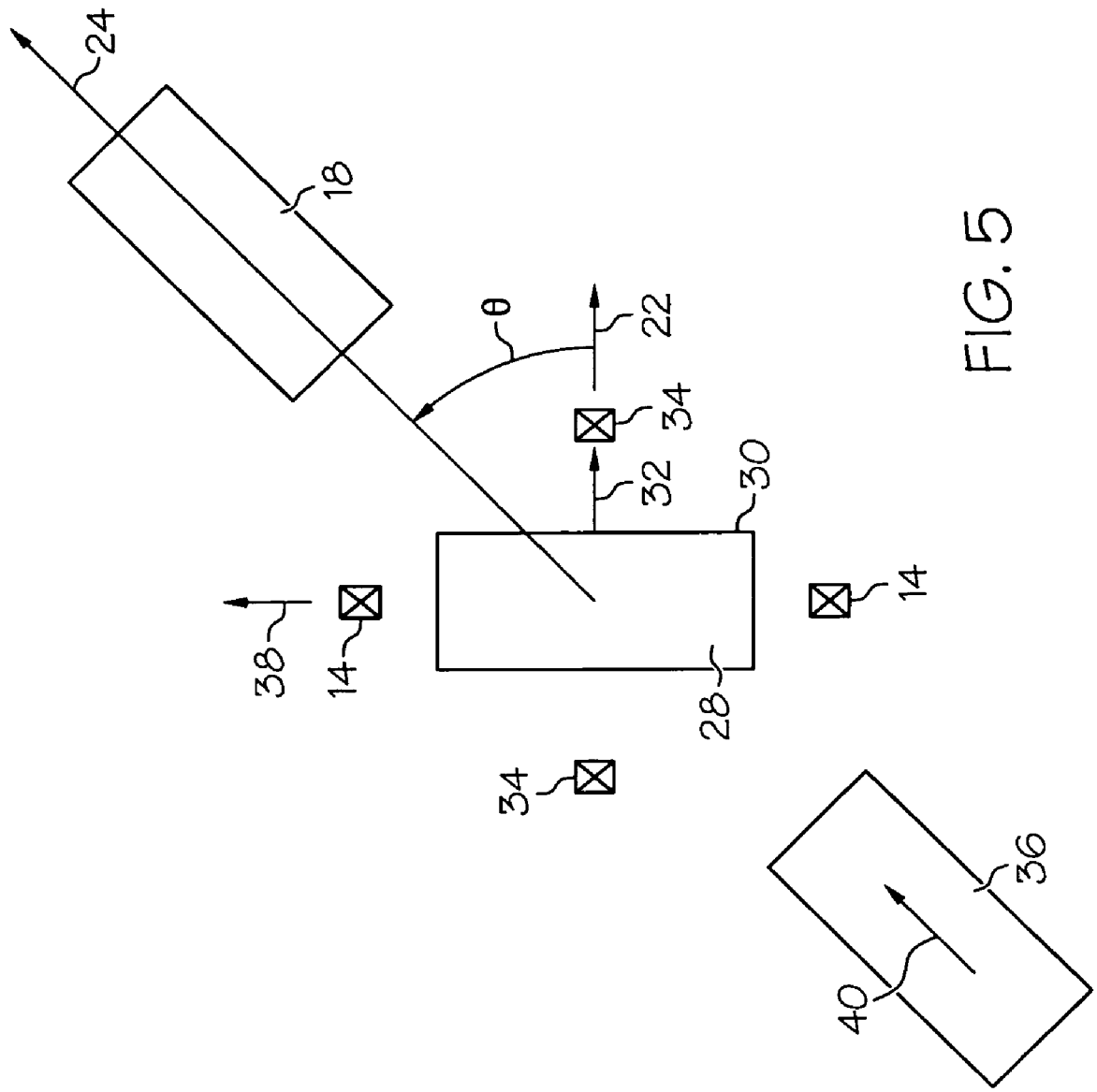
FIG. 5 is a view of the magnetosensitive device, the first and second coils, and the first and second magnets of FIG. 2 showing the central flux axis of the first permanent magnet rotated an angle θ from the central coil axis of the first coil, wherein the central coil axis of the first coil is substantially aligned with the normal axis of the sensing surface of the magnetosensitive device.

For two coils with orthogonal magnetic axes, as shown in FIG. 5, the flux linkage can be expressed as follows:

$$\lambda_1(\theta(t)) = \lambda_m \cos \theta(t) \quad (2)$$

$$\lambda_2(\theta(t)) = \lambda_m \sin \theta(t) \quad (3)$$

Here it is assumed that the first coil's axis makes an angle θ with respect to the magnets as shown in FIG. 5. The voltage induced in the two coils is obtained by differentiating the flux linkages with respect to time as follows:

$$v_1(t) = \frac{d\lambda_1(\theta(t))}{dt} = \frac{\partial \lambda_1}{\partial \theta}\frac{d\theta}{dt} \quad (4)$$

$$v_2(t) = \frac{d\lambda_2(\theta(t))}{dt} = \frac{\partial \lambda_2}{\partial \theta}\frac{d\theta}{dt} \quad (5)$$

The time derivative of the angle between the coil and magnet axes is the angular velocity, ω, between the two references as follows:

$$\omega = \frac{d\theta}{dt} \quad (6)$$

Substituting the flux linkage expressions, equations (2) and (3), and the angular velocity, equation (6), into the coil voltages, equations (4) and (5) yields:

$$v_1(t) = -\omega \lambda_m \sin \theta(t) \quad (7)$$

$$v_2(t) = \omega \lambda_m \cos \theta(t) \quad (8)$$

Taking the square root of the sum of the coil voltages allows one to solve for the angular velocity as follows:

$$\sqrt{v_1(t)^2 + v_2(t)^2} = \sqrt{\omega^2 \lambda_m^2 (\sin\theta^2 + \cos\theta^2)} = |\omega|\lambda_m \quad (9)$$

$$\text{angular velocity amplitude} = |\omega(t)| = \sqrt{v_1(t)^2 + v_2(t)^2}/\lambda_m \quad (10)$$

Note that equation 10 does not require calculating θ, but does require separately calculating the sign (plus or minus) of the rotary (angular) velocity ω.

One technique for calculating the sign of the rotary (angular) velocity ω is as follows. If you plot the voltages from the two coils against each other they produce a circle. As time advances, the direction of rotation of a line from the origin to the point {$v_1(t)$, $v_2(t)$} on the circle depends on the phase sequence (or sign of the velocity). Another technique of determining the phase sequences to use the digital phase sequence detector described in U.S. Pat. No. 4,337,435.

Alternatively, the angular velocity can be determined directly from equations (7) and (8) (when θ has been computed using the magnetosensitive device) as follows:

$$\omega = -v_1(t)/\lambda_m \sin \theta(t) \text{ for } \sin \theta \neq 0 \quad (11)$$

And similarly $$\omega = v_2(t)/\lambda_m \cos \theta(t) \text{ for } \cos \theta \neq 0 \quad (12)$$

In a second variation of the first enablement, the rotor 16 is rotatable less than half a revolution with respect to the stator 12 about the central longitudinal axis 20 of the stator 12, wherein the at-least-one coil 14 and 34 includes a first coil 14, and wherein the first coil 14 has a central coil axis 22 aligned substantially along the normal axis 32 of the sensing surface 30 of the magnetosensitive device 28. In one modification, the rotary position and velocity sensor 42 also includes a computer 26 adapted to receive as an input a voltage $v_1(t)$ induced in the first coil 14 and adapted to compute a rotary velocity ω of the rotor 16 with respect to the stator 12 about the central longitudinal axis 20 of the stator 12 using at least the input, a predetermined maximum flux linkage $\lambda_m$ of the first coil 14, and an angle θ about the central longitudinal axis 20 of the stator 12 between the central flux axis 24 of the first permanent magnet 18 and the central coil axis 22 of the first coil 14. In one illustration, the magnetosensitive device 28 has an output, and the computer 26 is adapted to compute the angle θ using the output of the magnetosensitive device 28.

When only one coil (the first coil 14) is present, one technique for computing the rotary (angular) velocity ω, when the total travel is less than half a revolution, is as follows.

The coil voltage must be divided by either sin θ or cos θ as described by equations (11) and (12) above. The locations of the coil and magnets relative to the range of motion must be carefully chosen to avoid singularities or numerical ill conditioning in these equations. As an example, it will be assumed that the maximum rotation about a nominal position is ±60 degrees. In this case, the optimum location of the coil with respect to the magnets is defined by equation (12). This is due to the fact that the angle dependent denominator term, cos θ, only varies between 0.5 and 1.0 for this range of motion. As the motion approaches ±90 degrees, numerical ill conditioning will increase as this term approaches zero. Using equation (11) in this case leads to a singularity at θ=0. Other relative locations between the coil(s), magnets and Hall (or other magnetosensitive) sensor are possible provided the issues of numerical stability and singularities are avoided. Using two coils avoids the singularity of the trig terms but, as previously noted, requires an additional step to determine the sign (direction) of the rotary (angular) velocity.

In one construction, as shown in FIG. 5, the leads 44 of the first coil 14, the leads 46 of the second coil 34, and the output leads 48 of the magnetosensitive device 28 are operatively connected to the input side of separate analog-to-digital converters 50 (represented as boxes labeled "ADC" in FIG. 5), wherein the output side of each ADC 50 is operatively connected to the computer 26 by a corresponding digital cable 52.

Several benefits and advantages are derived from one or more or all of the expressions of the embodiment of the invention. In one example, rotary velocity is computed without introducing undesirable noise and/or undesirable phase delay caused by conventional differentiation of the rotary position. This results in improved accuracy of the computed rotary velocity which results, in one application, in improved performance of an otherwise conventional vehicle controlled damping system when the rotary velocity sensor and/or the rotary position and velocity sensor of one or more or all of the expressions of the embodiment of the invention is employed to determine body height in a conventional vehicle controlled damping system.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

The invention claimed is:

1. A rotary velocity sensor comprising:
    a) a non-magnetic stator having a central longitudinal axis;
    b) a first coil non-rotatably attached to the stator;
    c) a non-magnetic rotor substantially coaxially aligned with the central longitudinal axis, surrounding the first coil, and rotatable with respect to the stator about the central longitudinal axis; and
    d) a first permanent magnet non-rotatably attached to the rotor.

2. The rotary velocity sensor of claim 1, wherein the first coil has a central coil axis aligned substantially perpendicular to the central longitudinal axis of the stator.

3. The rotary velocity sensor of claim 2, wherein the first permanent magnet has a central flux axis aligned substantially perpendicular to the central longitudinal axis of the stator.

4. The rotary velocity sensor of claim 3, wherein the rotor is rotatable less than half a revolution with respect to the stator about the central longitudinal axis of the stator.

5. The rotary velocity sensor of claim 4, also including a computer to receive as an input a voltage induced in the first coil and to compute a rotary velocity of the rotor with respect to the stator about the central longitudinal axis of the stator using at least the input, a predetermined maximum flux linkage of the first coil, and an angle about the central longitudinal axis of the stator between the central coil axis of the first coil and the central flux axis of the first permanent magnet.

6. The rotary velocity sensor of claim 5, also including a magnetosensitive device nonrotatably attached to the stator, surrounded by the rotor, having a sensing surface with a normal axis aligned substantially along the central coil axis of the first coil, and having an output, wherein the computer computes the angle using the output of the magnetosensitive device.

7. A rotary velocity sensor comprising:
a) a non-magnetic stator having a central longitudinal axis;
b) a first coil and a second coil each non-rotatably attached to the stator;
c) a non-magnetic rotor substantially coaxially aligned with the central longitudinal axis, surrounding the first and second coils, and rotatable with respect to the stator about the central longitudinal axis; and
d) a first permanent magnet and a second permanent magnet each non-rotatably attached to the rotor.

8. The rotary velocity sensor of claim 7, wherein the first coil has a central coil axis aligned substantially perpendicular to the central longitudinal axis of the stator, wherein the second coil has a central coil axis aligned substantially perpendicular to the central longitudinal axis of the stator, wherein the central coil axis of the second coil is substantially perpendicular to the central longitudinal axis of the first coil, and wherein the first and second coils are substantially identical.

9. The rotary velocity sensor of claim 8, wherein the first permanent magnet has a central flux axis aligned substantially perpendicular to the central longitudinal axis of the stator, wherein the second permanent magnet has a central flux axis aligned substantially along, and in a same direction with, the central flux axis of the first permanent magnet, and wherein the first and second permanent magnets are substantially diametrically opposed and substantially identical.

10. The rotary velocity sensor of claim 9, also including a computer to receive as inputs a voltage induced in the first coil and a voltage induced in the second coil and to compute a rotary velocity of the rotor with respect to the stator about the central longitudinal axis of the stator using at least the inputs and a predetermined maximum flux linkage of the first coil.

11. A rotary position and velocity sensor comprising:
a) a non-magnetic stator having a central longitudinal axis;
b) a magnetosensitive device non-rotatably attached to the stator and having a sensing surface with a normal axis aligned substantially perpendicular to the central longitudinal axis of the stator;
c) at least one coil non-rotatably attached to the stator and having a central coil axis aligned substantially perpendicular to the central longitudinal axis of the stator;
d) a non-magnetic rotor substantially coaxially aligned with the central longitudinal axis of the stator, surrounding the at least one coil, and rotatable with respect to the stator about the central longitudinal axis; and
e) at least one permanent magnet non-rotatably attached to the rotor.

12. The rotary position and velocity sensor of claim 11, wherein the magnetosensitive device and the at least one coil each are embedded in the stator.

13. The rotary position and velocity sensor of claim 12, wherein the at least one coil surrounds the magnetosensitive device.

14. The rotary position and velocity sensor of claim 13, wherein the magnetosensitive device is a Hall sensor.

15. The rotary position and velocity sensor of claim 14, wherein the at least one permanent magnet include a first permanent magnet and a second permanent magnet, wherein the first permanent magnet has a central flux axis aligned substantially perpendicular to the central longitudinal axis of the stator, wherein the second permanent magnet has a central flux axis aligned substantially along, and in a common direction with, the central flux axis of the first permanent magnet, and wherein the first and second permanent magnets are substantially diametrically opposed and substantially identical.

16. The rotary position and velocity sensor of claim 15, wherein the at least one coil includes a first coil and a second coil, wherein the first coil has a central coil axis aligned substantially along the normal axis of the sensing surface of the magnetosensitive device, wherein the second coil has a central coil axis aligned substantially perpendicular to the central longitudinal axis of the stator, wherein the central coil axis of the second coil is
substantially perpendicular to the central coil axis of the first coil, and wherein the first and second coils are substantially identical.

17. The rotary position and velocity sensor of claim 16, also including a computer to receive as inputs a voltage induced in the first coil and a voltage induced in the second coil and to compute a rotary velocity of the rotor with respect to the stator about the central longitudinal axis of the stator using at least the inputs and a predetermined maximum flux linkage of the first coil.

18. The rotary position and velocity sensor of claim 17, wherein the magnetosensitive device has an output, and wherein the computer computes an angle about the central longitudinal axis of the stator between the central flux axis of the first permanent magnet and the central coil axis of the first coil using the output of the magnetosensitive device.

19. The rotary position and velocity sensor of claim 15, wherein the rotor is rotatable less than half a revolution with respect to the stator about the central longitudinal axis of the stator, wherein the at least one coil includes a first coil, wherein the first coil has a central coil axis aligned substantially along the normal axis of the sensing surface of the magnetosensitive device, and also including a computer to receive as an input a voltage induced in the first coil and to compute a rotary velocity of the rotor with respect to the stator about the central longitudinal axis of the stator using at least the input, a predetermined maximum flux linkage of the first coil, and an angle about the central longitudinal axis of the stator between the central flux axis of the first permanent magnet and the central coil axis of the first coil.

20. The rotary position an velocity sensor of claim 19, wherein the magnetosensitive device has an output, and wherein the computer computes the angle using the output of the magnetosensitive device.

* * * * *